United States Patent [19]
Wedellsborg et al.

[11] Patent Number: 5,217,681
[45] Date of Patent: Jun. 8, 1993

[54] SPECIAL ENCLOSURE FOR A PRESSURE VESSEL

[76] Inventors: Bendt W. Wedellsborg; Ulrich W. Wedellsborg, both of 552 Maureen La., Pleasant Hill, Calif. 94523

[21] Appl. No.: 715,481

[22] Filed: Jun. 14, 1991

[51] Int. Cl.$^5$ .............................................. G21C 13/00
[52] U.S. Cl. .................................... 376/294; 376/461; 220/426; 220/586
[58] Field of Search ............... 376/293, 294, 295, 296, 376/461, 285; 220/4.01, 415, 469, 584, 586, 592, 426; 52/223 R, 225, 227

[56] References Cited

U.S. PATENT DOCUMENTS

| | | | |
|---|---|---|---|
| 3,256,069 | 6/1966 | Peterson | 220/592 |
| 3,329,297 | 7/1967 | Jordan | 220/592 |
| 3,433,382 | 3/1969 | Boggio | 220/592 |
| 3,445,971 | 5/1969 | Desmarchais et al. | 220/592 |
| 3,512,675 | 5/1970 | Pennell | 220/586 |
| 3,606,715 | 9/1971 | Wyss et al. | 220/581 |
| 3,653,434 | 4/1972 | Anderson | 376/294 |
| 3,775,251 | 11/1973 | Schabert | 376/294 |
| 4,192,718 | 3/1980 | Janakiev | 376/294 |
| 4,767,593 | 8/1988 | Wedellsborg | 376/294 |
| 4,949,363 | 8/1990 | Tupper et al. | 376/260 |
| 5,087,409 | 2/1992 | Wedellsborg et al. | 376/294 |

*Primary Examiner*—Daniel D. Wasil
*Attorney, Agent, or Firm*—Schneck & McHugh

[57] ABSTRACT

A prestressed pressure vessel safety enclosure is used as a pressure safety enclosure for a nuclear reactor pressure vessel or other primary system vessel containing fluid or gaseous material under high pressure, such as, steam generators, pressurizers and pumps. The special pressure vessel enclosure comprises a first pressure vessel containment assembly surrounding the primary pressure vessel. A pair of first upper and lower pressure vessel jackets are adapted to enclose and be spaced apart, respectively, from the upper and lower portions of the first pressure vessel containment assembly with the rims of the jackets adapted to be slidable and sealed with respect to the first pressure vessel containment assembly. The spaces between the jackets and pressure vessel containment assembly are filled with a high boiling point, low melting point metal. Upper and lower ring girders, connected to each other by tension tendon members, in conjunction with upper and lower jacket bearing plates and skirts are used to apply a force to the respective upper and lower jackets for moving the jackets toward or away from each other This application of force achieves continuously adjustable compression in the pressure vessel safety enclosure walls in order to compensate for creep and relaxation of tendon members and of the enclosure walls.

7 Claims, 12 Drawing Sheets

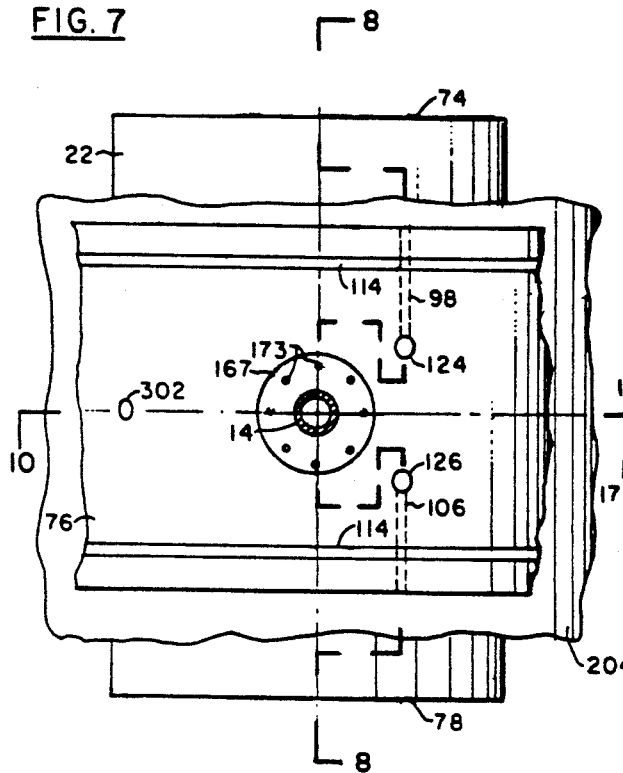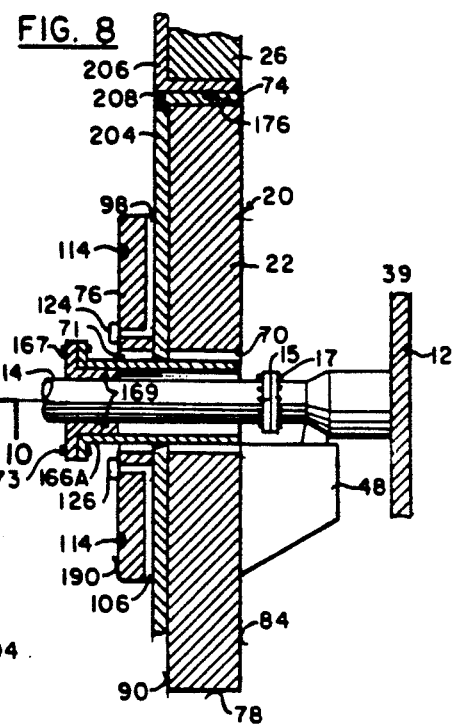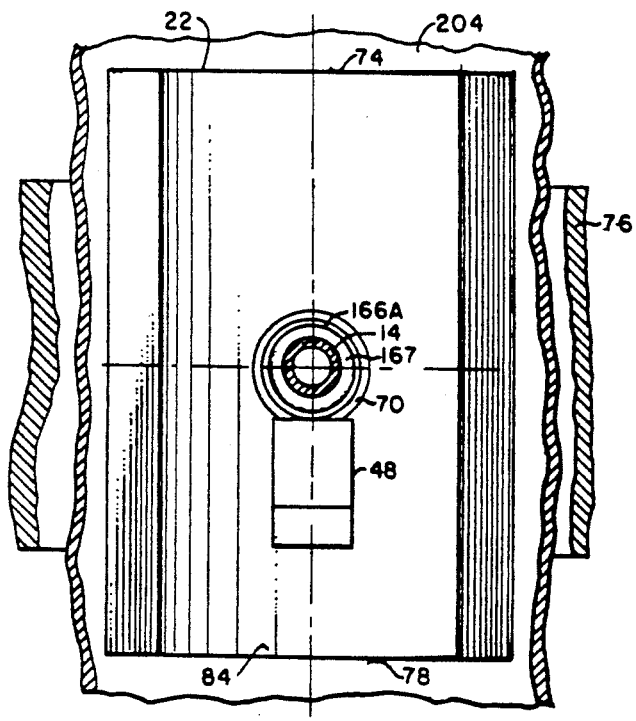

SPECIAL ENCLOSURE FOR A PRESSURE VESSEL

BACKGROUND OF THE INVENTION

This invention relates generally to pressure vessel enclosures and in particular to pressure vessel enclosures in which the compression in the enclosure walls can be continuously controlled and adjusted.

This invention also relates to pressure safety enclosures that can be disassembled and assembled for inspection of the primary pressure vessel and its welds with a minimum of time and effort.

Increasingly, in the operation of nuclear reactors, environmental degradation due to corrosion, mechanical or radiation effects on reactor vessel steels and weld materials have become a major concern. In order to extend its useful life, operating pressure or volume, a concept of a prestressed safety enclosure has been developed a nuclear reactor system.

For safety reasons, pressure vessels, particularly nuclear reactor pressure vessels, must be designed so that all pressure or load carrying welds can be inspected periodically. This inspection can be performed on the pressure vessel either prior to service or later while the system is temporarily out of service, such as, during a reactor refueling outage.

Most of the primary pressure vessels of the prior art comprised a single large vessel with one or more openings to gain access to the interior of the vessel. A flanged dome cover, usually fastened by studs to one end of the pressure vessel, provided the primary access to the interior of the vessel. To inspect the interior of the pressure vessel the studs in the peripheral flange surrounding the dome cover had to be removed in order for the dome to be removed.

The main purpose of the pressure safety enclosure (PSE) of the present invention is to contain the fragments of the primary pressure vessel (PPV), the hot radioactive coolant fluid, the fragments of the nuclear core and any fission products in the unlikely event of an explosion, leak or other failure of the primary pressure vessel (PPV).

SUMMARY OF THE INVENTION

Since the primary safety enclosure (PSE) is designed to function during an accident, the PSE must always be prepared for an accident. Therefore, it must be permanently stressed so that it is in a state of three-dimensional (3-D) compression. This is necessary so that the "gapping," that is, opening or separation of the cast-iron blocks, will never occur even during the worst accident scenario, when the PSE becomes pressurized and hot due to a (postulated) primary pressure vessel explosion.

The pressure vessel safety enclosure of the present invention is also adapted to enclose a primary pressure vessel, such as, a nuclear reactor pressure vessel, and contain it during operation.

The pressure vessel safety enclosure of the present invention comprises a first pressure vessel containment assembly enclosing the primary pressure vessel. This first pressure vessel enclosure comprises a set of cast-iron blocks defining a vault or enclosure under pressure. The cast-iron block core vault must be so thick that it will not buckle when subjected to the external pressure load provided by the surrounding filler, jackets and tendons.

The pressure vessel safety enclosure of the present invention further comprises a pair of first upper and first lower pressure vessel jackets that are adapted to enclose and be spaced apart from, respectively, the upper and lower halves of the pressure vessel safety enclosure (PSE). The space between the upper and lower pressure vessel jackets is filled with a low melting point, high boiling point metal. The rims of the upper and lower pressure vessel jackets are adapted to slidably engage, in a sealed relationship, the outer surface of the pressure vessel safety enclosure (PSE).

The upper and lower jackets are supported, respectively, by upper and lower bearing plates or seats attached to respective upper and lower frusto-conical skirts. The upper and lower skirts are, respectively, attached to upper and lower ring girders.

The upper and lower ring girders are connected to each other by a number of equally spaced, high-strength, post-tensioned tendon cables contained in insulated sleeves for corrosion protection. The ends of each of the tendon cables are connected to the respective upper and lower ring girders by a base anchor at the lower end and a permanent hydraulic or screw jack at the upper end.

The hydraulic or screw jacks provide the force necessary to move the upper and lower jackets toward or away from each other to increase or decrease the compression in the pressure vessel safety enclosure.

It is, therefore, an object of the present invention to provide a pressure vessel safety enclosure.

It is another object of the present invention to provide a pressure vessel safety enclosure in which the compression in the enclosure can be continuously monitored, controlled and adjusted.

It is a further object of the present invention to provide a pressure vessel safety enclosure in which moving jackets are used to control the compression in the vessel enclosure walls.

It is still another object of the present invention to provide a pressure vessel safety enclosure that is easily dismantled without the use of stud and flange connections.

It is another object of the present invention to provide a pressure vessel safety enclosure in which the compression in the walls of the enclosure is controlled and adjusted by the tension members holding the upper and lower pressure vessel jackets together.

These and other objects of the present invention will become manifest upon study of the following specification taken together with the drawings.

BRIEF DESCRIPTION OF THE DRAWINGS

FIG. 7 is a front or outer elevational view of a typical belt-line block with a reinforcing sleeve located proximate the mid-portion of the first pressure vessel containment assembly.

FIG. 8 is an elevational cross-section of the belt-line block of FIG. 7 taken at lines 8—8.

FIG. 9 is a back or inner elevational view of the belt-line block of FIG. 7.

DESCRIPTION OF THE PREFERRED EMBODIMENT

Figure 1:
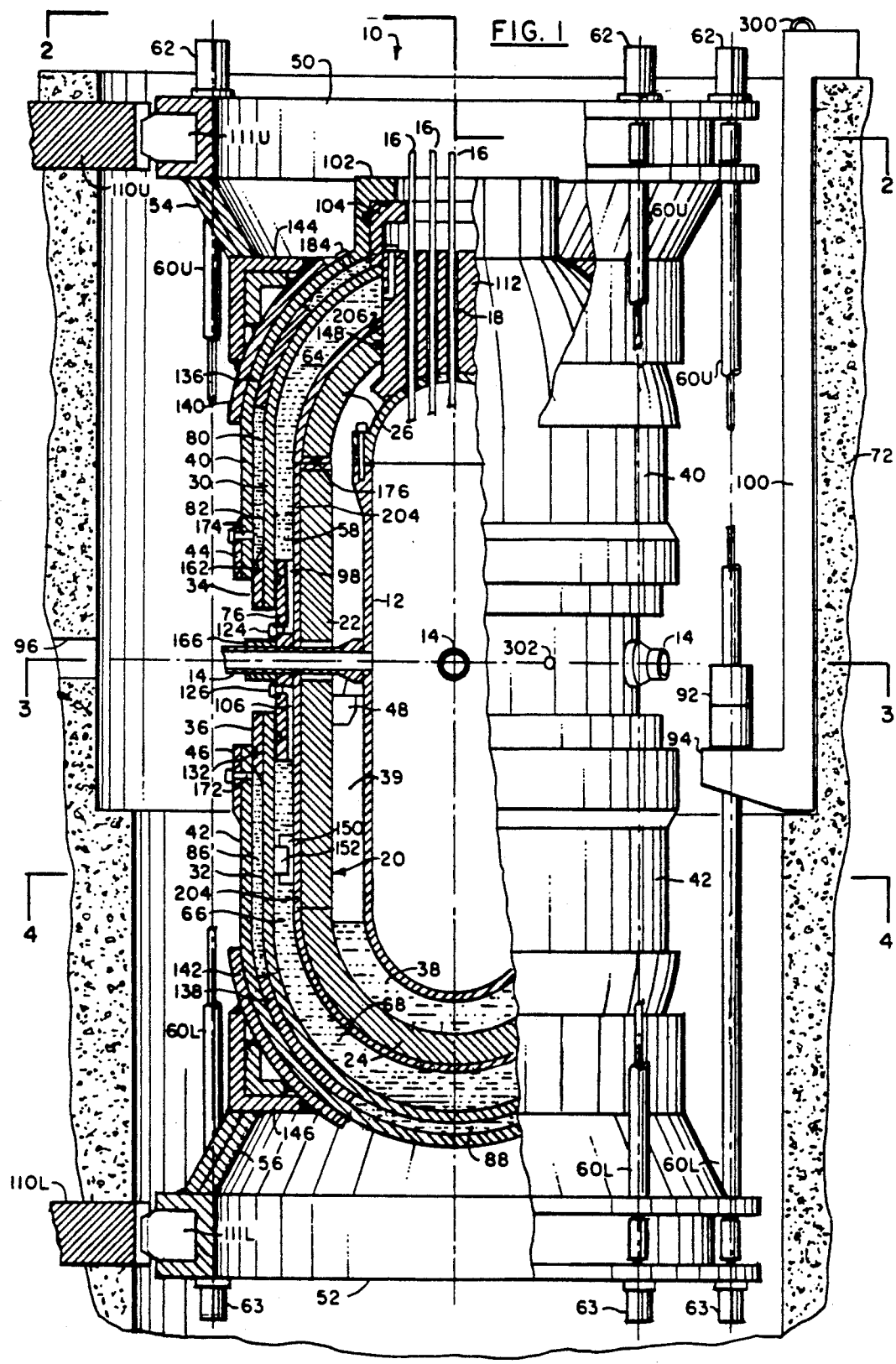
FIG. 1 is a partial sectional elevational view of the pressure vessel safety enclosure of the present invention.

With reference to FIG. 1 there is illustrated an elevational, partial cross-section of the pressure vessel safety enclosure 10 of the present invention. Pressure vessel safety enclosure 10 is intended to enclose a primary pressure vessel 12. Primary pressure vessel 12 can be any pressure vessel containing a fluid or gas under high pressure. In the present embodiment, a nuclear reactor pressure vessel is used as the example. This type of pressure vessel requires consideration to be given to fluid access by reactor coolant piping 14 and mechanical access by control rod standpipes 16. Using the pressure vessel safety enclosure 10 of the present invention, these standpipes 16 and their penetrations 18 can be readily allowed for.

Pressure vessel enclosure 10 of the present invention comprises, essentially, a first pressure vessel containment assembly 20 adapted to enclose primary pressure vessel 12. First pressure vessel containment assembly 20 comprises a set of cast iron belt-line blocks 22 resting on a cast iron hemispherical bottom support block 24 and capped with a cast iron hemispherical top closure block 26.

First pressure vessel containment assembly 20 further includes main body liner 204 adapted to tightly enclose bottom support block 24 and cast-iron belt-line blocks 22. The purpose of main body liner 204 is to fully enclose belt-line blocks 22 and bottom support block 24 and avoid the need for O-ring seals between cast-iron blocks 22 and 24. Furthermore, bottom support block 24, shown as a single cast-iron block in FIG. 1, can be cast in several pie-shaped hemispherical blocks to reduce need for large sized cranes when assembling and disassembling first pressure vessel containment assembly 20.

Pressure vessel containment assembly 20 further includes a top closure liner 206 adapted to tightly enclose top closure block or dome 26. This will also permit top closure block or dome 26 to be cast in several pie-shaped hemispherical blocks to reduce need for large sized cranes when assembling and disassembling first pressure vessel containment assembly 20.

The top rim of main body liner 204 is extended to cover the top rim of belt line blocks 22. In a like manner, the bottom rim of top closure liner 206 is extended to cover the bottom rim of top closure block 26. An O-ring seal 176 is provided between the top rim of main body liner 204 and the bottom rim of top closure block 206 to provide a pressure seal.

Primary pressure vessel 12 is supported within first pressure vessel containment assembly 20 by a pool of low melting point, high boiling point metal filler 38, such as, lead, bismuth, tin or various alloys thereof which may be liquid during service. It can be seen that the use of lead will tend to act as a buoyant force on primary pressure vessel 12 causing it to float within containment assembly 20.

In addition, pressure vessel 12 is further supported by primary pressure vessel support brackets 48 projecting radially inward from cast iron belt-line blocks 22 just under the point of attachment of coolant pipes 14 to primary pressure vessel 12.

A pair of first upper and first lower pressure vessel jackets 30 and 32, respectively, are adapted to enclose and be spaced apart, respectively, from the upper and lower portions of first pressure vessel containment assembly 20. Rims 34 and 36 of the respective first upper and lower pressure vessel jackets 30 and 32 are adapted to sealably and slidably engage belt-line reinforcing sleeve 76 encircling main body liner 204.

Interspace 64 between first upper jacket 30 and upper portion of first pressure vessel containment assembly 20 is also filled with a low melting point, high boiling point metal filler 58, such as, lead, bismuth, tin or alloys thereof which may be liquid during service. In a like manner, interspace 66 between first lower jacket 32 and the lower portion of first pressure vessel containment assembly 20 is also filled with a low melting point, high boiling point metal filler 68, such as, lead, bismuth, tin or alloys thereof which may be liquid during service. It can also be seen, that filler material 68 will also act to produce pressure and buoyant forces on first pressure vessel containment assembly 20. By adjusting the amount of filler material 68 in interspace 66, the compression in the first pressure vessel containment assembly can be adjusted.

A pair of second upper and second lower pressure vessel jackets 40 and 42 are adapted to enclose, respectively, first upper and first lower pressure vessel jackets 30 and 32. Rims 44 and 46 of the respective second upper and second lower pressure vessel jackets 40 and 42 are adapted to sealably and slidably engage, respectively rims 34 and 36 of first upper and first lower first pressure vessel jackets 30 and 32.

Interspace 80 between first upper pressure vessel jacket 30 and second upper pressure vessel jacket 40 is also filled with low melting point, high boiling point metal filler 82. This filler material may remain solid during reactor operation. In a like manner, interspace 86 between first lower pressure vessel jacket 32 and second lower pressure vessel jacket 42 is filled with a low melting point, high boiling point metal filler 88. This filler material may remain solid during reactor operation.

Upper and lower ring-girders 50 and 52, in conjunction with upper and lower frusto-conical skirts 54 and 56 are used for applying an increasing or decreasing force to the respective second upper and second lower jackets 40 and 42 for moving the jackets toward or away from each other. Upper and lower ring-girders 50 and 52 are connected to each other by upper and lower tension tendon members 60U and 60L, respectively. Hydraulic or screw jacks 62 proximate the top ends of tension members 60U are used to generate these forces. The bottom ends of tension tendon members 60L are attached to end caps 63.

It can be seen that as tendons 60 (60U and 60L) are tightened, first and second upper jackets 30 and 42 are moved toward first and second lower jackets 32 and 40. This will cause the pressure in interspaces 64, 66, 80 and 86 to increase. This increase in pressure will be transmitted to first pressure vessel containment assembly 20 to create compression in it and compression in the main body liner 204, top closure liner 206 and O-ring seal 176, as well as, cast iron belt-line blocks 22, bottom hemispherical block 24 and top hemispherical block 26.

It will also be noted that upper and lower tension tendon members 60U and 60L are connected to each other by a coupling 92. Coupling 92 is supported by support bracket 94 connected to support hanger 100 supported on biological shield (concrete wall) 72. A lifting handle or ring 300 is attached to the top of each support hanger 100. Lifting handles or rings 300 will permit a crane (not shown) to lift either an individual support hanger 100 or all support hangers 100 simultaneously to raise the entire pressure vessel assembly 10 out of biological shield enclosure 72.

Biological shield enclosure 72 is design so that it can be flooded with water or a boron solution for emergency cooling of the pressure vessel enclosure 10 of the present invention. A large drop in temperature will occur in the pressure vessel jackets, however, this will only cause a relatively small increase in stress because jackets 30, 40, 32 and 42 can contract easily while tension tendon members 60U and 60L stretch.

It can be seen that as tension is applied to tension members 60U and 60L, the position of the centerline of coolant piping 14 of pressure vessel safety enclosure 10 will remain stationary relative to coolant pipe penetration 96 in biological shield 72.

The entire pressure vessel safety enclosure 10 is contained in and supported by a generally cylindrical concrete biological shield structure or outer support housing 72.

Figure 2:
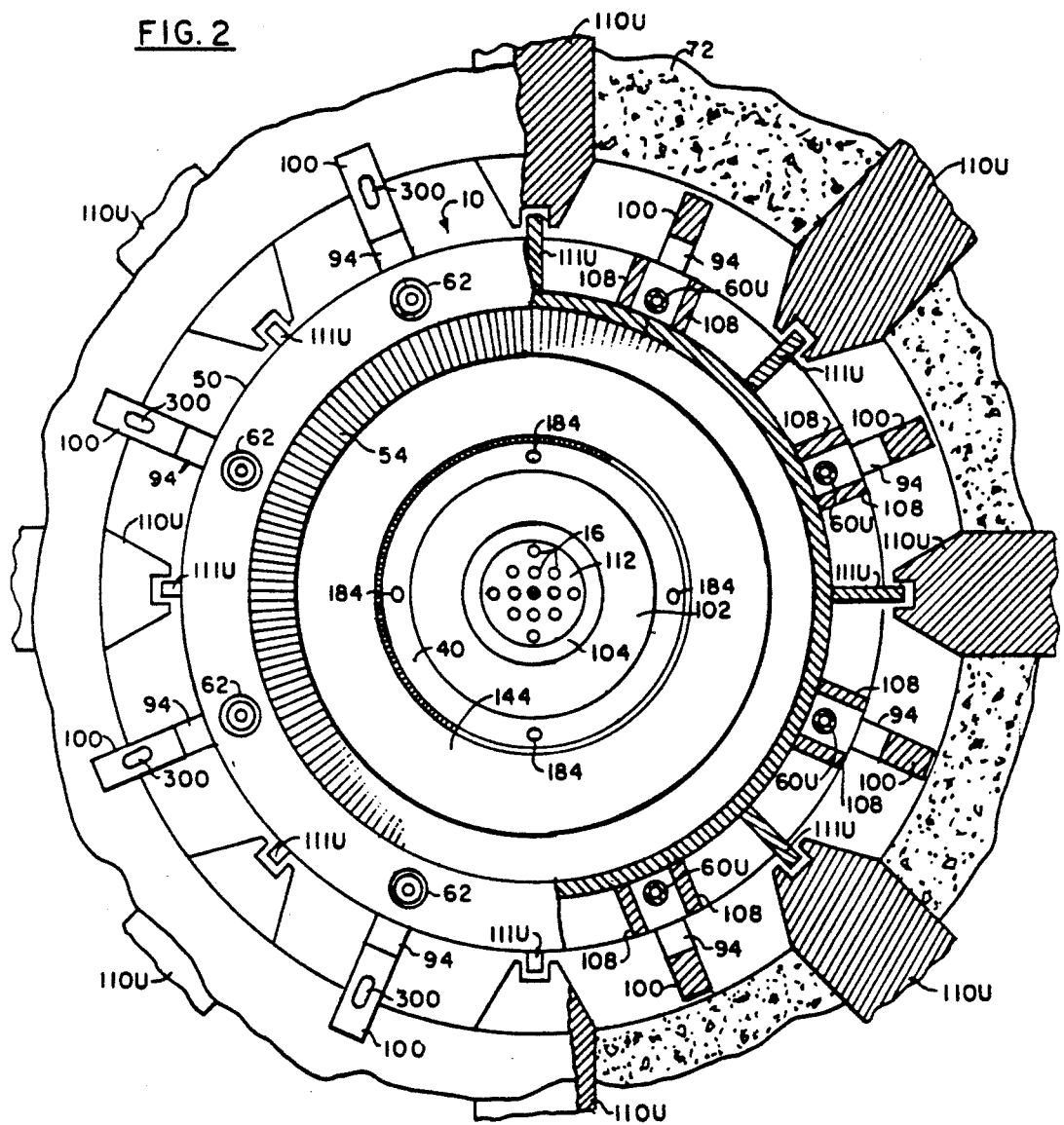
FIG. 2 is a horizontal cross section of the pressure vessel safety enclosure of FIG. 1 taken at lines 2—2.

With reference to FIG. 2, there is illustrated a partial sectional view of the pressure vessel safety enclosure 10 of FIG. 1 taken at lines 2—2. FIG. 2 shows the top view of ring girder 50 with its hydraulic or screw jacks 62 and top head portion 102 of second upper jacket 40. It also shows top head portion 104 of first upper jacket 30. Through the openings of top portions 102 and 104 can be seen a top view of control rod standpipes 16 penetrating top grid plug 112.

Shown in partial section are tendon tension cables 60U between ring girder gusset plates 108. Also shown are support hangers 100 and radial support brackets 94 adapted to support pressure vessel safety enclosure 10 by tendon couplings 92 (FIG. 1).

Figure 16:
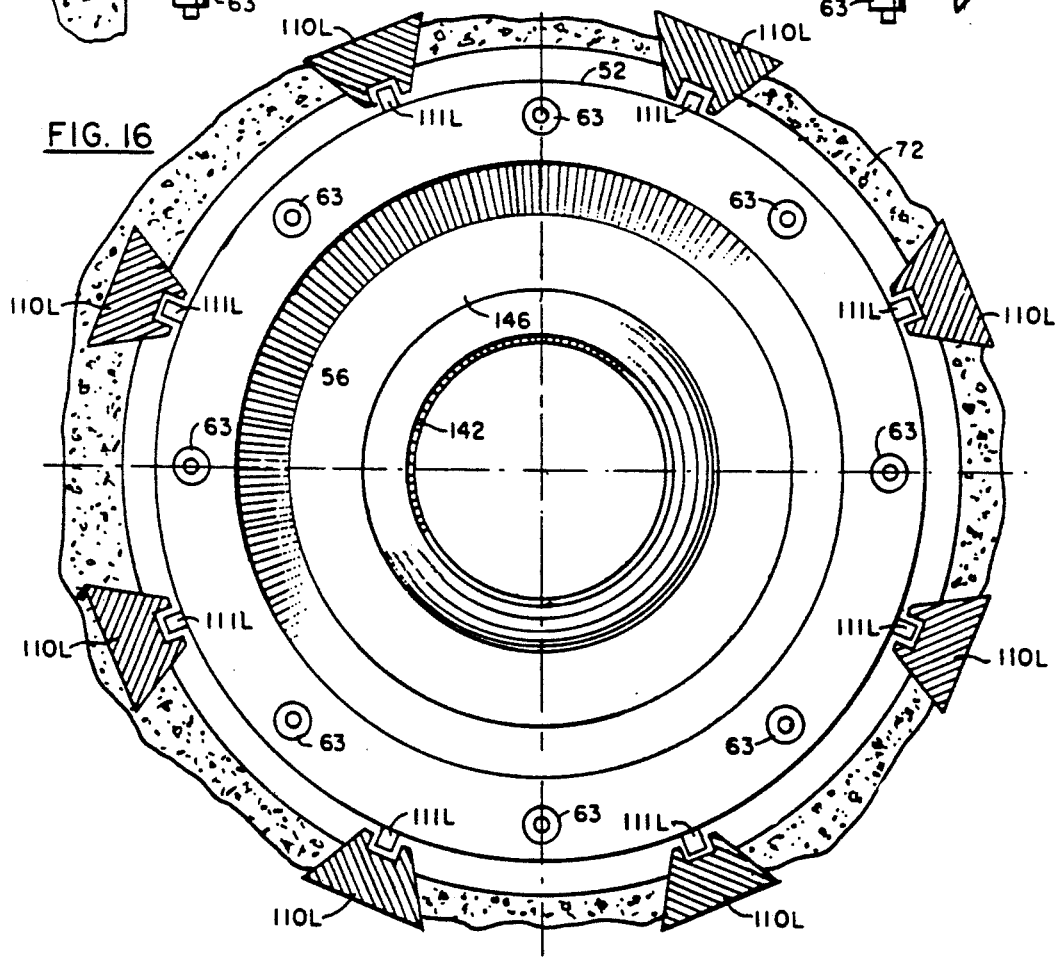
FIG. 16 is bottom view looking up at the lower ring girder, frusto-conical skirt and lower external bearing plate or seat of FIG. 15.

Also shown in FIG. 2 are upper radial seismic guides, upper keys or brackets 110U imbedded in concrete biological shield 72. These guides or keys cooperate with upper seismic guide stops 111U attached to upper ring girder 50, as by welding or the like. Corresponding lower radial seismic guides, keys or brackets 110L, shown in FIG. 16, are also imbedded in concrete biological shield 72. These lower guides or keys cooperate with lower seismic guide stops 111L attached to lower ring girder 52, as by welding or the like. These two sets of seismic guides and stops are used to prevent excessive sway and rotation of pressure vessel assembly 10 during a seismic disturbance.

Figure 3:
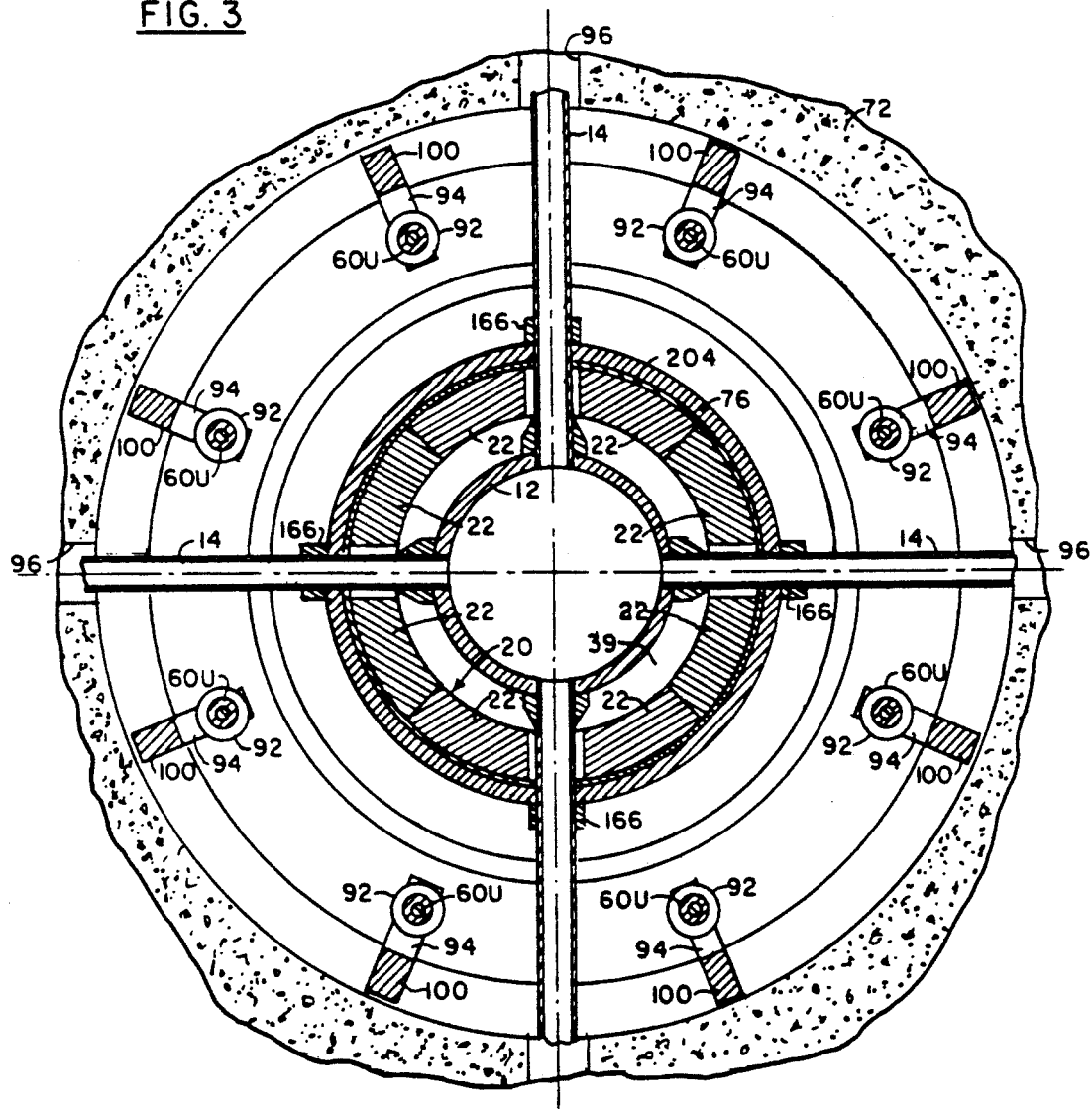
FIG. 3 is a horizontal cross section of the pressure vessel safety enclosure of FIG. 1 taken at lines 3—3.

With reference to FIG. 3, there is illustrated a sectional view of pressure vessel safety enclosure 10 taken at lines 3—3 proximate mid-section showing the general configuration of coolant piping and a cross section of first pressure vessel containment assembly 20 proximate the belt-line thereof. Belt-line block sections 22 are shown assembled and made pressure tight by main body liner 204 and belt-line reinforcing sleeve 76.

Figure 4:
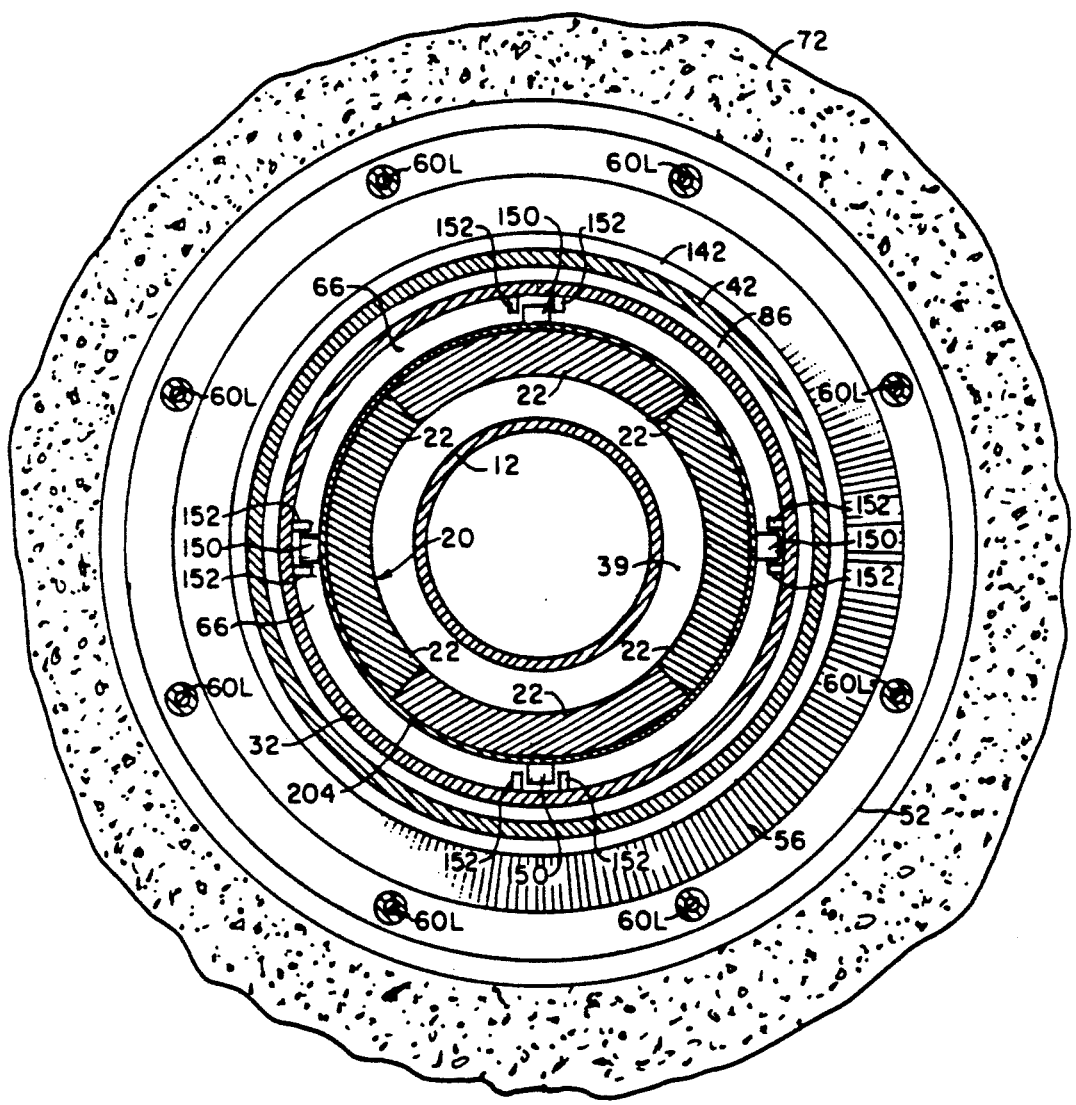
FIG. 4 is a horizontal cross section of the pressure vessel safety enclosure of FIG. 1 taken at lines 4—4.

With reference to FIG. 4, there is illustrated a cross-section of pressure vessel safety enclosure 10 taken at lines 4—4 of FIG. 1 showing configuration of lower second jacket 42, lower first jacket 32, the lower portion of first pressure vessel containment assembly 20 and main body liner 204 to each other. Also shown are first pressure vessel centering guide 150 enclosed between first pressure vessel guide brackets 152 to maintain interspace 66. Four such guides are mounted 90 degrees apart.

Figure 5:
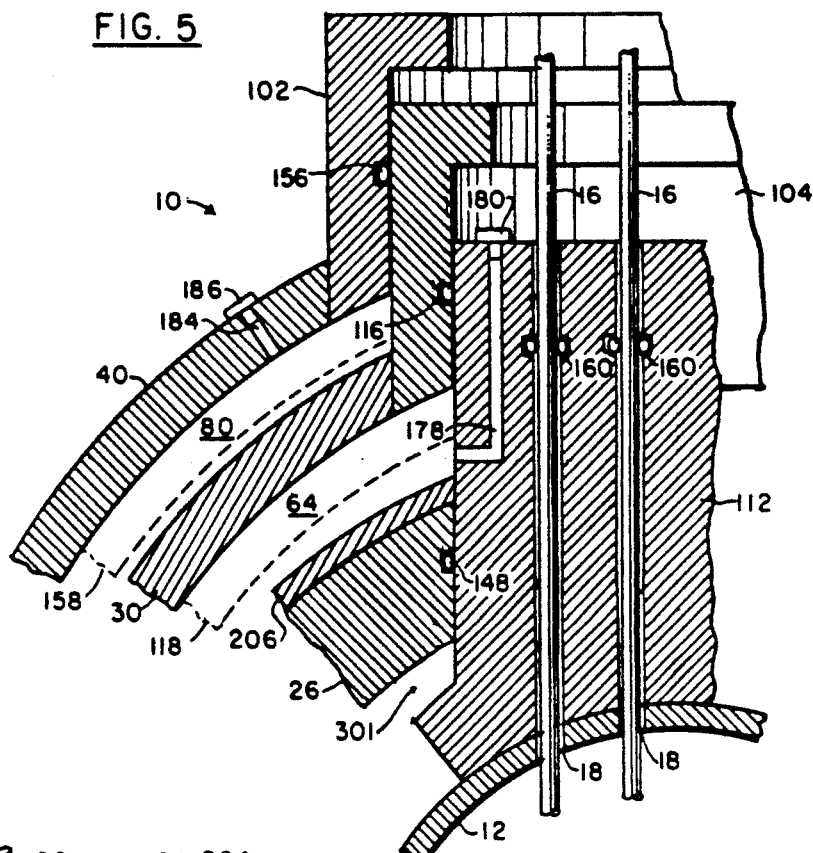
FIG. 5 is an elevational cross-section detail of the method of connecting and sealing the first upper pressure vessel jacket to the outer surface of the upper portion of the first pressure vessel containment assembly.

With reference to FIG. 5 there is illustrated an elevational cross-section of the top portion of pressure vessel safety enclosure 10 of the present invention. In particular, there is shown the top portion 104 of first upper jacket 30, top portion 102 of second upper jacket 40 and the top grid plug 112 mounted on top of primary pressure vessel 12.

It can be seen that top portion 104 of first upper jacket 30 is adapted to slidably engage the outside surface of top grid plug 112. Top portion 104 is also provided with an O-ring seal 116 between the inner surface of top portion 104 and the outer surface of top grid plug 112. This will allow top portion 104 to move up or down to a position indicated by dashed line 118 and thereby increase or decrease, respectively, the volume of interspace 64. An additional O-ring seal 148 is provided between top grid plug 112 and top closure block 26. It will be further noted that a space 301 is provided between top closure block 26 and the radially extended bottom portion of top plug 112. This space is necessary to permit primary pressure vessel 12 to expand in the vertical direction.

It can also be seen that top portion 102 of second upper jacket 40 is adapted to slidably engage the outer surface of top portion 104 of first upper jacket 30. Top portion 102 is provided with an O-ring seal 156 between the inner surface of top portion 102 and the outer surface of top portion 104. This will allow top portion 102 to move up or down to a position indicated by dashed line 158 and thereby increase or decrease, respectively, the pressure and volume within interspace 80.

It will also be further noted that the control rod standpipes 16 penetrate top grid plug 112 through standpipe penetrations 18. An O-ring seal 160 is provided to prevent pressure leakage from the interior of first pressure vessel containment assembly 20.

An interspace filler conduit 178 is also provided in top grid plug 112 to gain access to interspace 64 when filling it with filler material 82. Plug 180 is provided to seal conduit 178 after the filling process is completed. Normally, however, the filler material, being solid at room temperature, is installed "cold" in the form of sheets when the pressure vessel is initially assembled. By so doing, the assembly time is reduced since the filler material need not be melted and piped into the interspaces through the relatively small filler conduits. The filler conduits are thus used to "top off" the filler material in the interspaces after assembly to be assured that there are few if any voids. It is important that both filler materials 82 and 58 completely fill their respective interspaces 80 and 64.

Figure 5A:
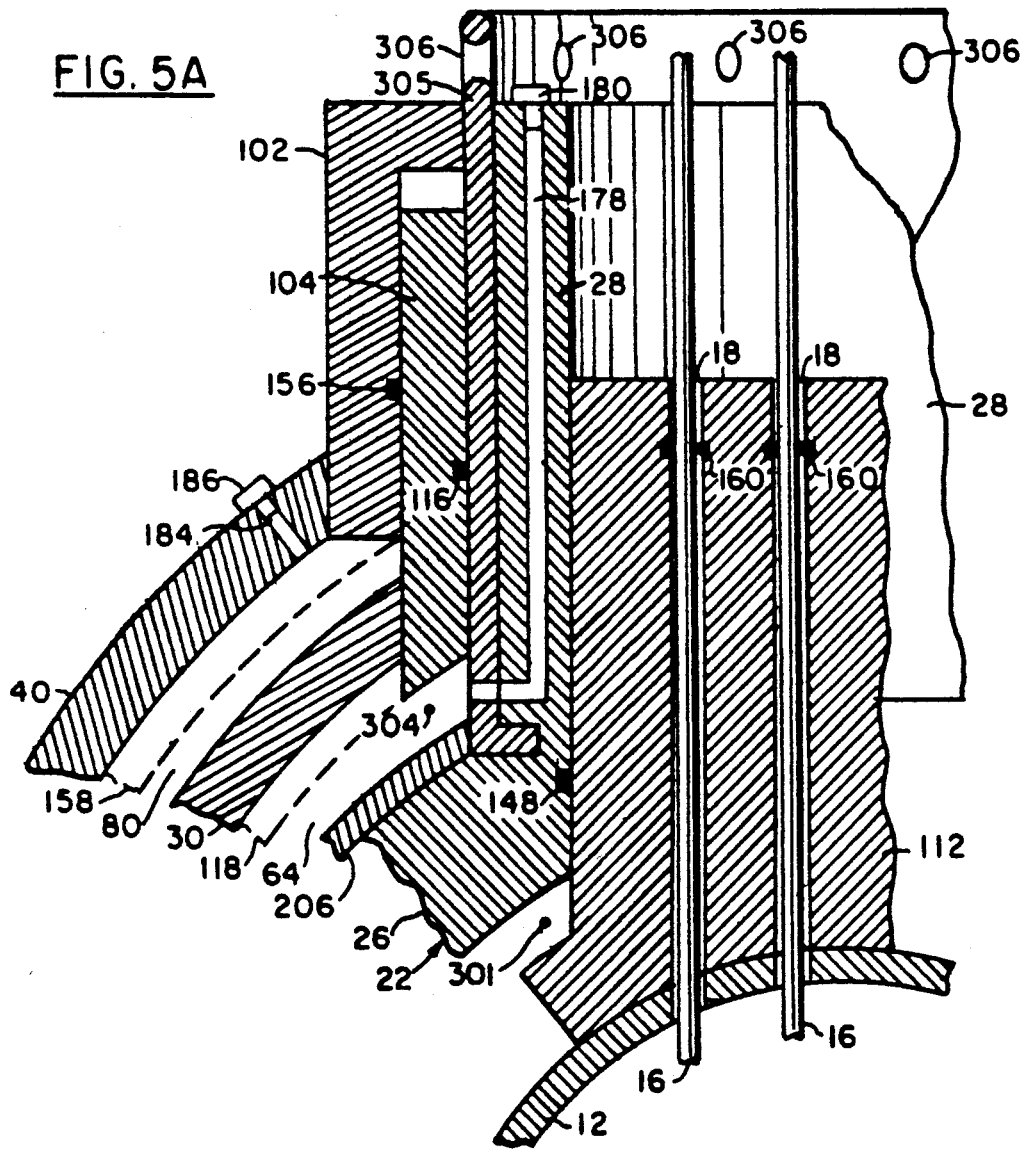
FIG. 5A is an elevational cross-section detail of a further embodiment of the top head section in which the top closure block, first upper and second upper pressure vessel jackets can be removed as a single unit.

With reference to FIG. 5A, there is illustrated a further embodiment of the top head portion of pressure vessel safety enclosure 10. In FIG. 5A, hemispherical top closure block 26 is provided with a generally cylindrical top head portion 28. The inner surface of top head portion 28 is adapted to slidably engage the outer surface of top grid plug 112 and sealed with O-ring seal 148.

A lifting ring or cylinder 305 is adapted to be connected to or encircle top head portion 28. Lifting holes 306 are provided around the top portion of lifting ring 305 which are adapted to receive lifting hooks of a crane (not shown). Plug 180 for filler conduit 178, shown in FIG. 5 as penetrating top grid plug 112, is shown in FIG. 5A as penetrating top head portion 28, in order to access space 64.

It will also be noted that the bottom end of top head portion 104 has been extended below first upper pressure vessel jacket 30 to about dashed line 118 to leave a space 304 between the bottom surface of top head portion 104 and the top surface of top closure liner 206 enclosing top closure block 26. The purpose of this downward extension of top head portion 104 is to provide a bearing surface or "stop" for upward movement of first pressure vessel containment assembly 20. This upward movement is caused by the enormous buoyant forces from the liquid metal (lead or the like) filler 58 in interspace 64. It is important that filler material 58 completely fills interspace 64.

Figure 6:
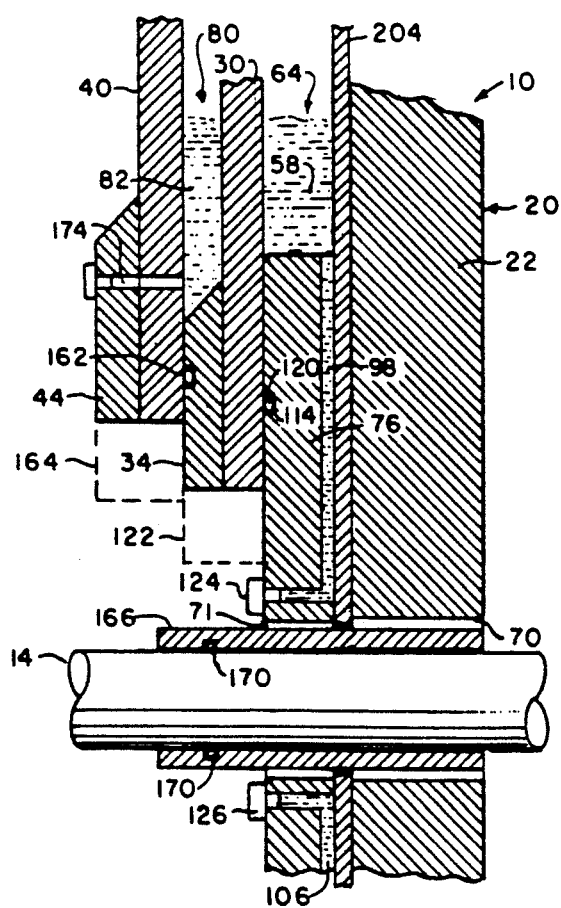
FIG. 6 is an elevational cross-section detail of the method of connecting and sealing the lower rim of the first upper pressure vessel jacket to the belt-line blocks proximate the mid-portion of the first pressure vessel containment assembly.

With reference to FIG. 6, there is illustrated an elevational cross-section of FIG. 1 showing the configuration for slidably engaging and sealing bottom rim 34 of first upper jacket 30 to belt-line reinforcing sleeve 76 of first pressure vessel containment assembly 20. In particular, an O-ring seal 120 is provided in groove 114 between the inner surface of rim 34 and the outer surface of belt-line reinforcing sleeve 76. The vertical movement of jacket 30 is shown by dashed line 122 to either increase or decrease the pressure and volume within interspace 64.

FIG. 6 also shows the configuration for slidably engaging and sealing bottom rim 44 of second upper jacket 40 to the bottom rim 34 of first upper jacket 30. In particular, an O-ring seal 162 is provided between the inner surface of rim 44 and the outer surface of bottom rim 34. The vertical movement of jacket 40 is shown by dashed line 164 to either increase or decrease the pressure and volume within interspace 80.

FIG. 6 also illustrates the first method of allowing coolant pipe 14 to penetrate first pressure vessel containment assembly 20 and belt-line reinforcing sleeve 76. In particular, a nozzle member 166 is attached, as by welding or the like, to main body liner 204. Nozzle or cooling pipe penetration 70 in block 22 and nozzle penetration 71 in belt-line block 76 are of sufficient diameter to allow for a space between the outside surface of nozzle member 166 and inside surface those penetrations for clearance and access to the weld attaching nozzle member 166 to main body liner 204.

The inside diameter of nozzle member 166 is made sufficient to allow a small amount of clearance for the outside diameter of coolant pipe 14. The inside surface of nozzle 166 is provided with an O-ring seal 170 to provide a pressure seal between coolant pipe 14 and nozzle 166.

Belt-line reinforcing sleeve 76 is a sleeve that fits around cast-iron belt-line blocks 22 outside of main body liner 204. It extends radially outward above and below coolant pipe 14 to establish the horizontal width of interspace 64. The outside surface of belt-line sleeve 76 is machined to provide a smooth slidable surface for the inner surface of rim 34. Belt-line sleeve 76 also adds extra strength to withstand the internal pressure within first pressure vessel containment assembly 20.

Many of these features are shown in greater detail in FIGS. 7-10 and 10A.

With reference to FIGS. 7, 8, 9, 10 and 10A, there is illustrated several views of a typical cast-iron belt-line sleeve 76 and its relationship to cast-iron belt-line blocks 22 and main body liner 204.

These Figures also illustrate a second method for allowing coolant pipe 14 to penetrate first pressure vessel assembly 20. This second method permits access to pipe flange 15 connecting coolant pipe 14 to primary pressure vessel 12 in interspace 39 between primary pressure vessel 12 and first pressure vessel containment assembly 20. This will permit primary pressure vessel 12 to be removed after top closure block 26 in removed leaving the rest of pressure vessel safety enclosure 10 in place.

Figure 10:
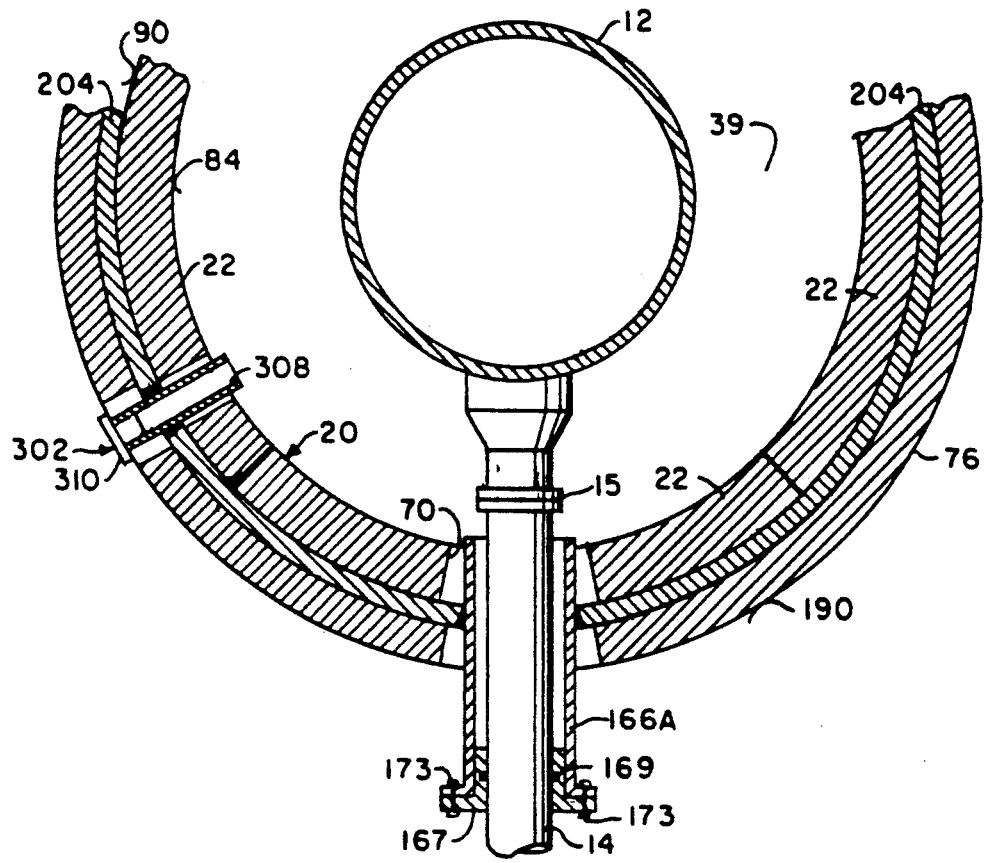
FIG. 10 is a horizontal cross-section of the belt-line block of FIG. 7 taken at lines 10—10.

With particular reference to FIG. 7, there is illustrated a front elevational view a cast-iron belt-line block 22 comprising an upper surface 74, a lower surface 78, an inner surface 84 and an outer surface 90 (see also FIGS. 8 and 10). A first coolant pipe penetration 70 (FIGS. 8 and 9) is located proximate the center of block 22. A second coolant pipe penetration 71 is located in belt-line sleeve 76 concentric with first coolant pipe penetration 70. Both penetrations are adapted to receive nozzle member 166A with sufficient clearance for access to the weld attaching main body liner 204 to nozzle member 166A.

Completely enclosing belt-line blocks 22, as previously described, is main body liner 204. The purpose of main body liner 204 is to provide a pressure tight seal for belt-line blocks 22 and hemispherical cast-iron bottom support blocks 24.

Also encircling main body liner 204 above and below coolant pipe penetration 71 is belt-line reinforcing sleeve 76. Sleeve 76 is adapted to fit tightly around the outer surface of liner 204 and be attached thereto, as by welding or the like. The outer surface of belt-line sleeve 76 may machined or otherwise provided with an accurate cylindrical surface to match the inside surface of rims 34 and 36 of upper and lower jackets 30 and 34, respectively. Grooves 114 are cut in the upper and lower portions of sleeve 76 to accommodate O-ring seals 120 (see FIG. 6).

Nozzle member 166A is attached, as by welding or the like, to main body liner 204. Nozzle member 166A is to be distinguished from nozzle member 166 in that it is designed to have an inside diameter larger than the outside diameter of both coolant pipe 14 and flange 15 connecting coolant pipe 14 to primary pressure vessel 12. The interspace between coolant pipe 14 and nozzle member 166A must be sufficient for access to install and remove bolts 17 in flange 15. The interspace must also be sufficient for removal of that portion of flange 15 attached to coolant pipe 14 through nozzle member 166A. Nozzle member 166A is also provided with a flange at its outer end.

To center coolant pipe 14 within nozzle member 166A, nozzle spacer member 167, with its outer flange abutting the outer flange of nozzle member 166A, is installed around coolant pipe 14 proximate the outer end of nozzle member 166A. Nozzle spacer member flange bolts 173 are used to attach the flange portion of nozzle spacer member 167 to the flange portion of nozzle member 166A. An O-ring seal 169 about the inner surface of nozzle spacer member 167 provides the pressure seal against coolant pipe 14 to maintain pressure within interspace 39. A further O-ring seal 171 (FIG. 10A) between the flanges of nozzle member 166A and 167 provide a further pressure seal to maintain pressure within interspace 39.

Outer surface 190 of belt-line sleeve 76 may also be machined or otherwise provided with a smooth surface. The upper portion of belt-line reinforcing sleeve 76 in the region of O-ring groove 114, in conjunction with O-ring 120, is adapted to slidably and sealably engage the inner surface of rim 34 of first upper pressure vessel 30. The lower portion of belt-line reinforcing sleeve 76 in the region of O-ring groove 114 is adapted to slidably and sealably engage the inner surface of rim 36 of first lower pressure vessel 32.

Leak chase penetration or duct 302 is also located proximate the horizontal centerline of belt-line sleeve 76. Duct 302 is used to monitor leaks pressure leaks from primary pressure vessel 12 into interspace 39.

With reference to FIG. 8, there is illustrated a side cross-sectional view of cast-iron belt-line block 22 including main body liner 204 and belt-line reinforcing sleeve 76. Also shown is upper interspace filler conduit 98 used when filling interspace 64 with metal filler 58 and lower interspace filler conduit 106 used when filling interspace 66 with metal filler 68.

As noted previously, when initially assembled, filler material 58 is installed in interspace 64 in the form of sheets while "cold" or in the solid state. In a similar manner, filler material 68 is installed in interspace 66 in the form of sheets while "cold" or in the solid state. Filler conduits 98 and 106 are used only to "top off" adjust the level of filler material when it is in the "hot" or liquid state during reactor operation. Plugs 124 and 126 are used, respectively, to seal filler conduits 98 and 106. Primary pressure vessel support block 48 is shown attached to inner surface 84 of cast-iron belt-line block 22.

Arcuate O-ring groove 176 in main body liner 204 located in top ring portion 208 proximate top surface 74 of block 22 is used to provide a seal between that portion of top closure liner 206 covering the surface of the bottom rim of hemispherical cast-iron top closure block 26. Top ring portion 208 is that portion of main body liner 204 covering top surface 74 of cast-iron belt-line block 22.

With reference to FIG. 9 there is illustrated a rear elevational view of cast-iron belt-line block 22 showing the arcuate inner surface 84 with piping penetration 70 and primary pressure vessel support bracket 48 attached thereto.

With reference to FIG. 10, there is illustrated a top horizontal cross-section of cast-iron belt-line block 22 taken at line 10—10 of FIG. 7. It can be seen that arcuate blocks 22 represents 90 degree sections of first pressure vessel containment assembly 20.

It will also be noted that leak chase duct 302 penetrates both belt-line sleeve 76 and belt-line block 22. It comprises a leak chase conduit 308 attached, as by welding or the like. to main body liner 204. A leak chase cap or plug 310 is used to seal conduit 308.

Figure 10A:
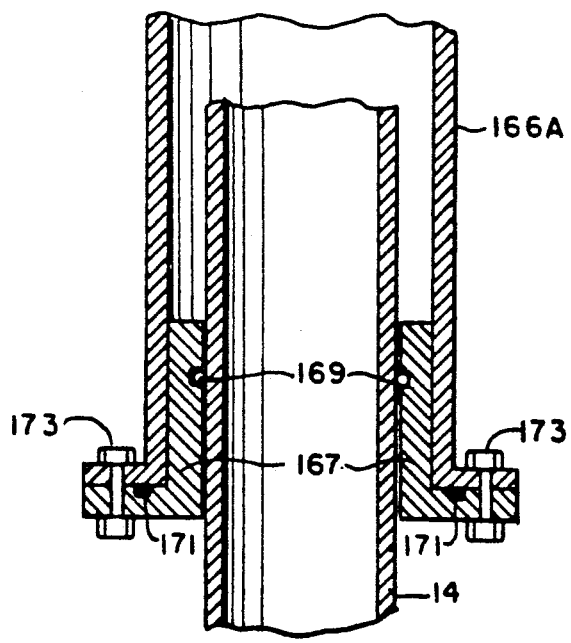
FIG. 10A is an enlarged horizontal cross-section of the nozzle portion of FIG. 10 showing the manner in which coolant piping is sealed and its connection flange to the primary pressure vessel is made accessible.

With reference to FIG. 10A, there is illustrated an enlarged view of nozzle member 166A, nozzle spacer member 167 and coolant pipe 14. It will be noted that O-ring 171 is used to provide a pressure seal between nozzle member 166A and nozzle spacer member 167.

Figure 11:
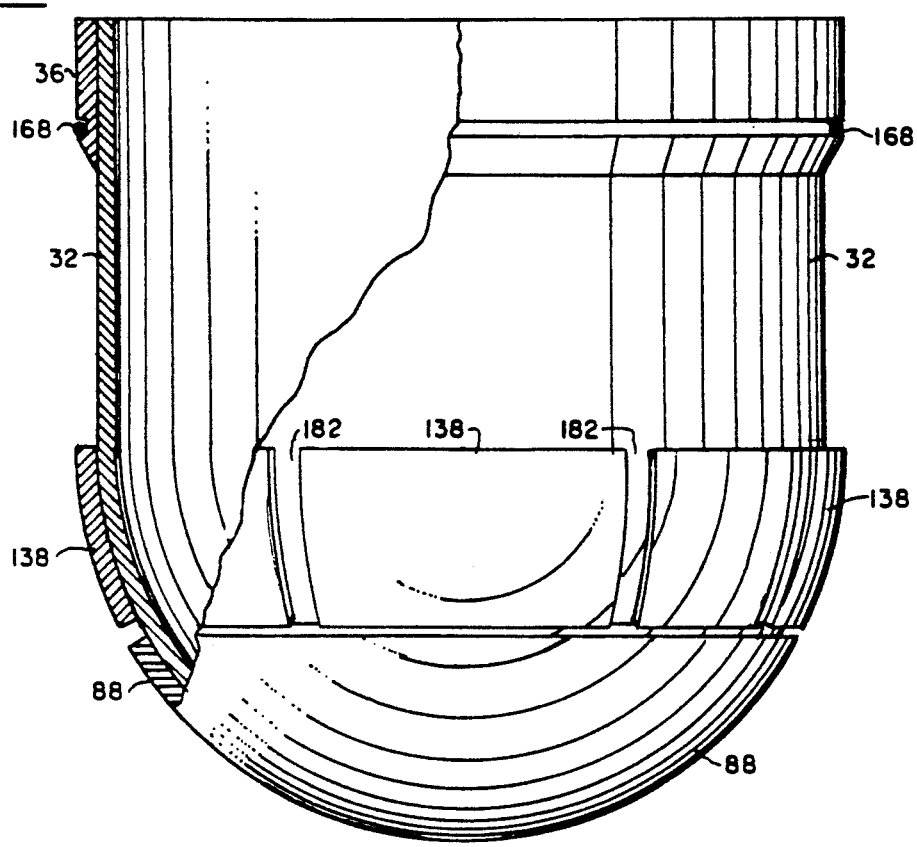
FIG. 11 is an elevational, partial cross-section of a first lower pressure vessel jacket showing the location of the spacer bearing plates and filler layers.

With reference to FIG. 11 there is illustrated an elevational partial section of first lower pressure vessel jacket 32 in the outer surface of which are attached several first lower internal bearing plates 138. These plates are designed to receive a portion of the force exerted by second lower outer bearing plates 142 (see FIG. 1). Bearing plates 138 are spaced apart to define channels 182 to allow filler material 88, when in the liquid phase, to flow into the bottom area of interspace 86.

An O-ring seal 168 is provided in the outer surface of rim 36 to seal the inner surface of rim 46 of second lower pressure vessel jacket 42.

Figure 12:
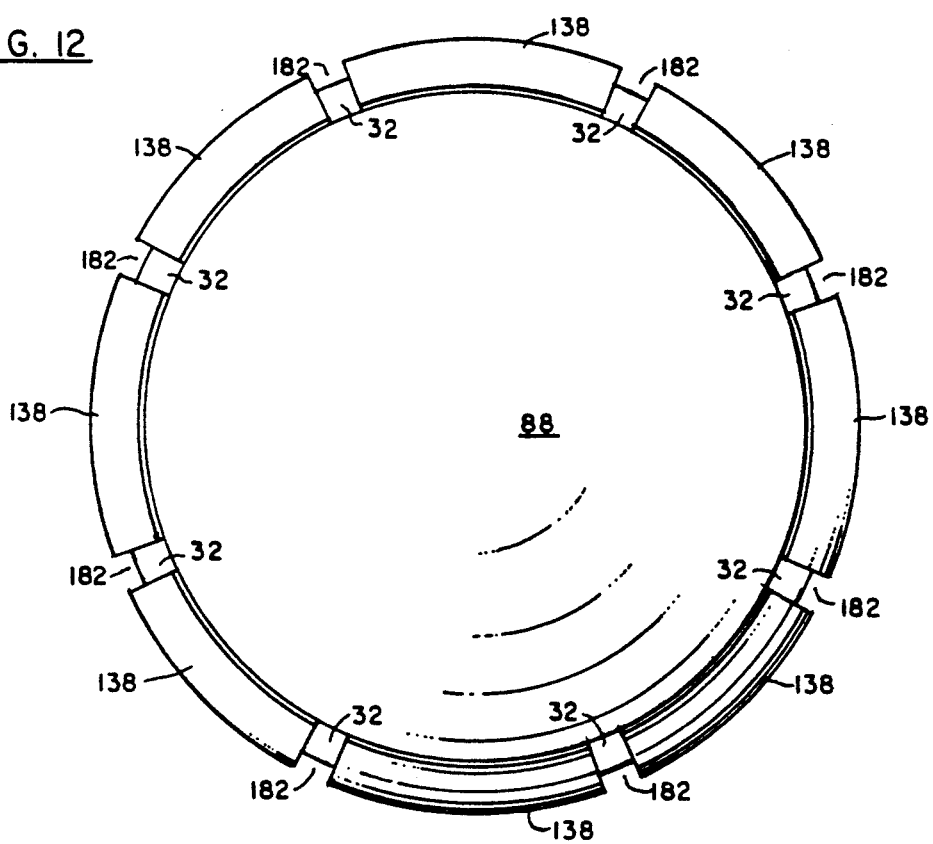
FIG. 12 is a bottom view of first pressure vessel jacket of FIG. 11 showing the projected area of the bearing plates.

With reference to FIG. 12, there is illustrated a bottom view of first lower pressure vessel 32 showing the projected areas for first lower internal bearing plates 138 and filler material 88.

Figure 13:
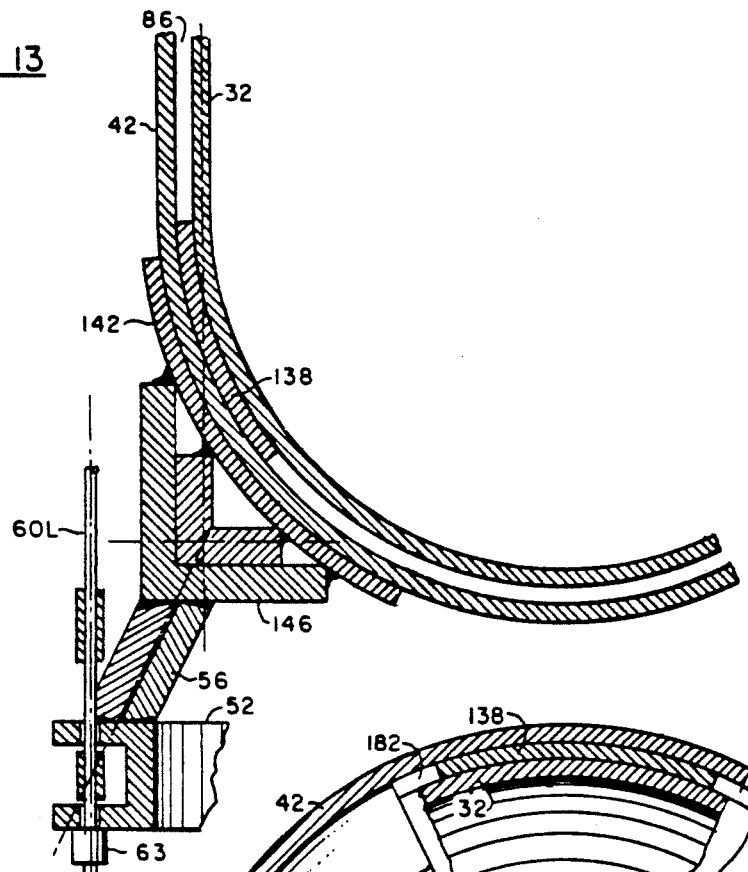
FIG. 13 is an elevational cross-section of the lower bearing plate or seat with first and second lower pressure vessel jackets showing the structure of the first and second lower pressure vessel jackets and their relation to the lower internal bearing plate.

With reference to FIG. 13, there is illustrated an elevational partial cross-section of the lower vessel support seat for pressure containment assembly 20 showing how the forces exerted by tension tendon members 60 (60U and 60L) are transmitted through lower ring girder 52, lower frusto-conical skirt 56 and lower vessel support seat 146 to first lower pressure vessel jacket 32 through second lower external bearing plate 142, second lower pressure vessel jacket 42 and first lower internal bearing plate 138.

Figure 14:
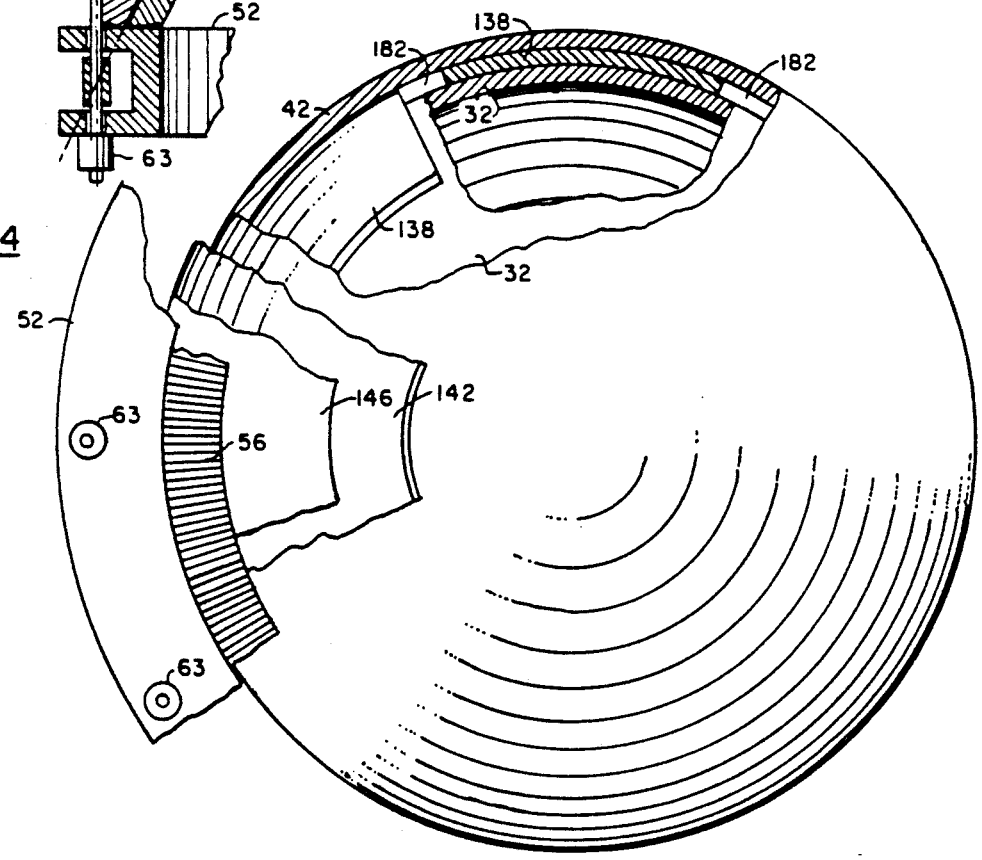
FIG. 14 is a bottom view looking up at the pressure vessel safety enclosure of FIG. 13 and partially cutaway to show the projected area of the bearing plates.

FIG. 14 is a partial sectional bottom view of the pressure vessel of FIG. 13 showing the various layers bearing plates 142 and 138 attached, respectively, to second lower pressure vessel jacket 42 and first lower pressure vessel jacket 32.

Figure 15:
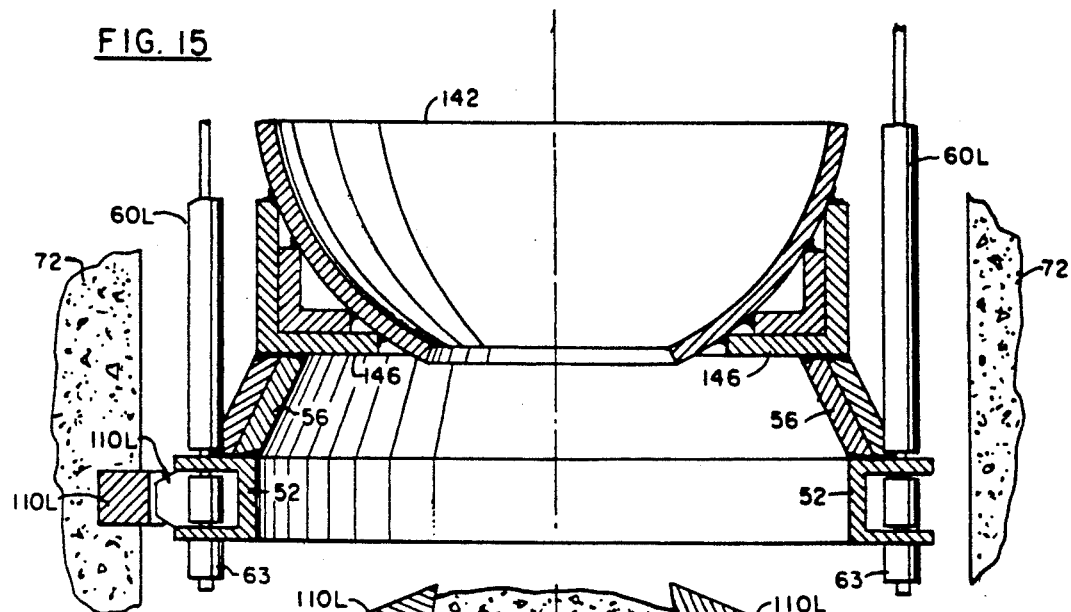
FIG. 15 is an elevational cross-section of the lower ring girder, frusto-conical skirt and lower external bearing plate or seat ready to receive the second lower pressure vessel jacket.

FIG. 15 is an elevational cross-section of lower ring girder 52, frusto-conical skirt 56, lower vessel support seat 146 and lower external bearing plate 142 ready to receive second lower pressure vessel jacket 42 (not shown in FIG. 15). It can be seen that lower external bearing plate 142 somewhat resembles a bottomless bowl.

FIG. 15 further shows the manner in which lower seismic guides 110L interact with lower seismic guide stops 111L.

FIG. 16 is bottom view looking up at the combination of lower ring girder 52, frusto-conical skirt 56, lower vessel support seat 146 and lower external bearing plate or seat 142 of FIG. 15.

Figure 17:
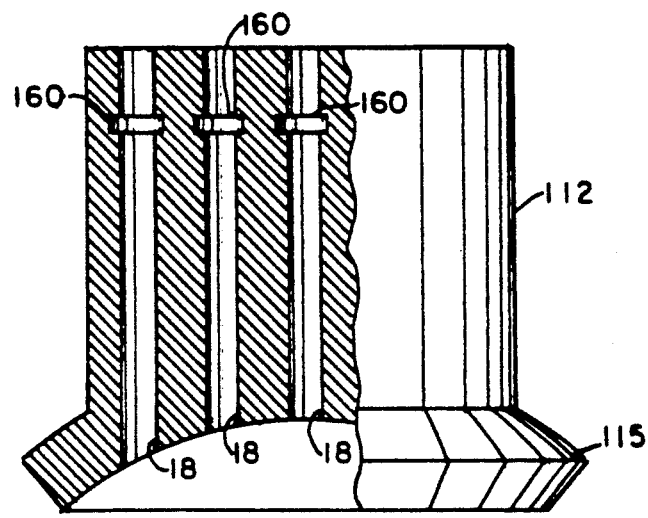
FIG. 17 is an elevational partial cross-section of the top grid plug showing, in greater detail, its shape and internal conduits for receiving the reactor control rods.

FIG. 17 is an elevational partial cross-section of top grid plug 112 showing its shape and internal conduits 18 for receiving the reactor control rods (not shown) in greater detail. Top plug 112 further comprises a partially spherical bottom skirt 115 adapted to engage the top dome of primary pressure vessel 12, and shown in FIG. 18.

Figure 18:
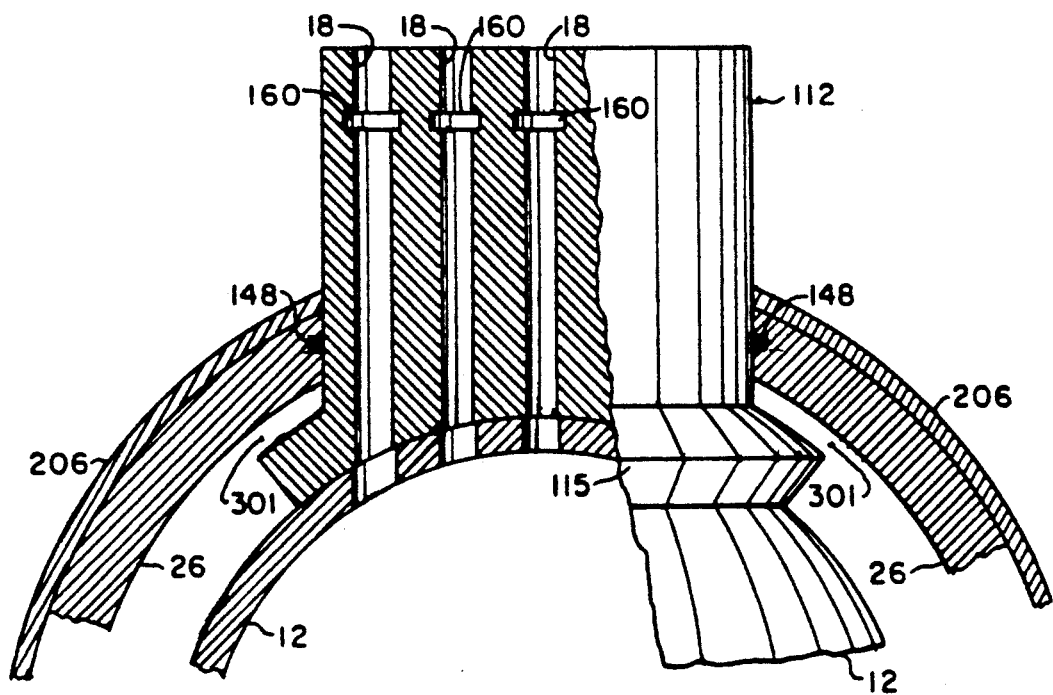
FIG. 18 is an elevational cross-section of the top grid plug showing its relationship to the primary pressure vessel and the manner in which it functions with the hemispherical cast-iron top closure block and the top closure liner.

FIG. 18 is an elevational cross-section of top grid plug 112 showing its relationship to primary pressure vessel 12 and the manner in which it functions with hemispherical cast-iron top closure block 26 and top closure liner 206.

ASSEMBLY AND OPERATION

To assemble pressure vessel safety enclosure 10 of the present invention, the shopweld assembly comprising lower ring girder 52, lower frusto-conical skirt 56, lower vessel support seat 146 and lower bearing plate or seat 142, is lowered into the enclosure defined by biological shield 72 using tension tendon members 60L. Support hangers 100, including support bracket 94, are placed at equiangular positions around biological shield 72 supported by the upper edge thereof. Tendon caps 63 are attached to the bottom end of each tension tendon member 60L. Tendon couplings 92 are attached to the upper end of each of the tension tendon members 60L and mounted on support bracket 94 to allow the lower ring girder 52 bearing plate assembly (see FIG. 15) to hang free.

Next, second lower pressure vessel jacket 42 is lowered into the enclosure defined by biological shield 72 and allowed to rest or bear against lower bearing plates or seats 142.

After second lower pressure vessel jacket 42 is in position, first lower pressure vessel jacket 32, with filler material 86 attached in the form of sheets, is lowered to telescope inside second lower pressure vessel jacket 42 until first lower bearing plate 138 rests or bears against the inside surface of second lower pressure vessel jacket 42. The assembly is now ready to receive main body liner 204 which is lowered into place such that centering guides 150, radially projecting outwardly from main body liner 204 are received between pressure vessel guide brackets 152 attached to the inside surface of first lower pressure vessel jacket 32.

Hemispherical cast-iron bottom support block 24 is lowered into main body liner 204 followed by belt-line blocks 22 to define the lower portion of first pressure vessel containment assembly 20. When all are assembled, the top ring portion 208 of main body liner 204 containing O-ring seal groove 176, is attached, as by welding or the like, to main body liner 204 thus forming the top surface of belt-line blocks 22.

Primary pressure vessel 12 can now be lowered into the lower portion of first pressure vessel containment assembly 20 until it rests on primary pressure vessel support bracket 48. To lessen the downward forces on bracket 48, a low melting point, high boiling point metal 38, such as lead or the alloys thereof, can be installed in the bottom of pressure vessel containment assembly 20 "cold" in the form of solid blocks. The blocks can be positioned to temporarily support first pressure vessel containment assembly 20. When the blocks melt after the reactor is in operation, the buoyant forces of the fluid metal can provide an uplift force on primary pressure vessel 12. In the alternative, primary pressure vessel 12 can be fabricated to have an outside diameter equal to the inside diameter of first pressure vessel containment assembly 20. This will reduce the tensile stress in the primary pressure vessel walls by transmitting pressure to vessel 20.

Liquid coolant piping 14 can now be installed by inserting the piping with its portion of flange 15 attached through nozzle member 166A and attaching it to corresponding portion flange 15 attached to primary pressure vessel 12 using flange bolts 17. It can be seen that by varying the level of liquid metal filler 38 in interspace 39, primary pressure vessel 12 can be raised or lowered to adjust the level of that portion of flange 15 attached to pressure vessel 12 to the mating portion of flange 15 attached to the end of coolant pipe 14 (see FIG. 10).

After the dome of primary pressure vessel 12 is installed, top grid closure plug 112 is installed on top of primary pressure vessel 12 as shown in FIG. 18. Top closure block 26 with top closure liner 206 is then installed and the entire assembly lowered until the bottom surface of liner 206 engages the top surface of liner 204 and O-ring seal 176.

Next, first upper pressure vessel jacket 30 is lowered so that its upper portion 104 slidably engages the outer surface of top grid plug 112 and its lower rim 34 slidably engages the outer surface of belt-line reinforcing sleeve 76.

Second upper pressure vessel jacket 40 is then lowered so that its upper portion 102 slidable engages the outer surface of upper portion 104 of first upper jacket 30 while its lower rim 44 slidably engages the outer surface of rim 34 of first upper jacket 30. The lowering of second upper jacket 40 is continued until second upper internal bearing plate 136 (see FIG. 1) makes contact with the inside surface of second upper jacket 40.

Now that second upper pressure vessel jacket 40 is in place, the assembly comprising ring girder 50, upper frusto-conical skirt 54, upper vessel support seat 144 and upper bearing plate 140, is lowered until bearing plate 140 rests on or bears against jacket 40.

To complete the assembly, the lower ends of tension tendon members 60U are attached to tendon coupling 92 while the upper ends of tension tendon members 60U are attached to hydraulic or screw jacks 62.

When assembled, the enclosure may be heated to melt the fillers that were installed "cold" in the form of sheets. Final adjustment of filler level can be done by pumping additional filler material in the molten state in, or bleeding some of the filler off, through filler access ducts 98, 106, 172 and 174.

It will be noted that interspace filler conduit 174 is used to fill interspace 80 with filler material 82. When filling interspace 80, plug 186 of interspace filler conduit 184 is removed to allow gasses trapped in the upper portion of interspace 80 to escape. In a similar manner and for the same reason, when filling interspace 64, cap 180 of interspace filler conduit 178 is also removed.

As pressure vessel safety enclosure 10 is placed in operation, it can be seen that by applying tension to tension tendon members 60 (60U and 60L) using hydraulic or screw jacks 62, pressure vessel jackets 30, 42, 40 and 42 can be caused to move toward or away from each other. In this manner, the internal pressures against first pressure vessel containment assembly 20 and primary pressure vessel 12 can be controlled and maintained.

We claim:

1. A pressure vessel safety enclosure comprising
a primary pressure vessel,
a first pressure vessel containment assembly adapted to enclose said primary pressure vessel and be spaced apart therefrom,
a pair of first upper and first lower pressure vessel jackets adapted to enclose and be spaced apart, respectively from upper and lower halves of said first pressure vessel containment assembly,
said first upper and lower pressure vessel jackets comprising
rims proximate their openings,
said rims connected in a slidable and sealed relationship to said first pressure vessel containment assembly, and
means connected to said pressure vessel jackets for moving said jackets toward and away from each other.

2. The pressure vessel safety enclosure of claim 1 wherein said means connected to said pressure vessel jackets for moving said jackets toward and away from each other comprises
an upper ring girder
an upper frusto-conical skirt connected to said upper ring girder and adapted to bear against said upper pressure vessel jacket,
a lower ring girder
a lower frusto-conical skirt connected to said lower ring girder and adapted to bear against said lower pressure vessel jacket,
a plurality of tension tendon members having their upper ends connected to said upper ring girder and their lower ends connected to said lower ring girder, said tension tendon members disposed at equal angular intervals around said upper and lower ring girders, and
means for increasing and decreasing the tension in said tension tendon members 3. A pressure vessel safety enclosure comprising
a primary pressure vessel,
a first pressure vessel containment assembly adapted to enclose said primary pressure vessel and be spaced apart therefrom,
a main body liner enclosing first pressure vessel containment assembly,
a belt-line reinforcing sleeve encircling said main body liner proximate mid-portion of said first pressure vessel containment assembly,
a pair of first upper and first lower pressure vessel jackets adapted to enclose and be spaced apart, respectively, from upper and lower halves of said first pressure vessel containment assembly,
said first upper and lower pressure vessel jackets comprising
rims proximate their openings,
said rims adapted to slidably engage, in a sealed relationship, the outer surface of said belt-line reinforcing sleeve encircling said main body liner proximate the mid-portion of said primary pressure vessel containment assembly, and
means connected to said pressure vessel jackets for moving said jackets toward and away from each other.

4. The pressure vessel safety enclosure of claim 3 wherein said means connected to said pressure vessel jackets for moving said jackets toward and away from each other comprises
an upper ring girder
an upper frusto-conical skirt connected to said upper ring girder and adapted to bear against said upper pressure vessel jacket,
a lower ring girder
a lower frusto-conical skirt connected to said lower ring girder and adapted to bear against said lower pressure vessel jacket,
a plurality of tension tendon members having their upper ends connected to said upper ring girder and their lower ends connected to said lower ring girder, said tension tendon members disposed at equal angular intervals around said upper and lower ring girders, and
means for increasing and decreasing the tension in said tension tendon members.

5. A pressure vessel enclosure comprising
a primary pressure vessel,
a first pressure vessel containment assembly adapted to enclose said primary pressure vessel and be spaced apart therefrom,
a first upper pressure vessel jacket adapted to enclose the upper half of said first pressure vessel containment assembly and be spaced apart therefrom, said upper pressure vessel jacket having an upper rim and a lower rim, each of said rims connected in a slidable relationship to the outer surface of said first pressure vessel containment assembly,
means for connecting in a sealable relationship said upper rim of said first upper pressure vessel jacket to the outer surface of said first pressure vessel containment assembly,
means for connecting in a sealable relationship said lower rim of said first upper pressure vessel jacket to the outer surface of said first pressure vessel containment assembly,
a first lower pressure vessel jacket adapted to enclose the lower half of said first pressure vessel containment assembly and be spaced apart therefrom, said lower pressure vessel jacket having an upper rim connected in a slidable relationship to the outer surface of said first pressure vessel containment assembly, and
means for connecting in a sealable relationship said upper rim of said first lower pressure vessel jacket to the outer surface of said first pressure vessel containment assembly,
a second upper pressure vessel jacket adapted to enclose said first upper pressure vessel jacket and be spaced apart therefrom, said second upper pressure vessel jacket having an upper rim and a lower rim, each of said rims adapted to slidably engage the outer surface of said first upper pressure vessel jacket,
means for sealing said upper rim of said second upper pressure vessel jacket to the outer surface of said first upper pressure vessel jacket, means for sealing said lower rim of said second upper pressure vessel jacket to the outer surface of said first upper pressure vessel jacket, a second lower pressure vessel jacket adapted to enclose said first lower pressure vessel jacket and be spaced apart therefrom, said second lower pressure vessel jacket having an upper rim adapted to slidably engage the outer surface of said first lower pressure vessel jacket, means for sealing said upper rim of said second lower pressure vessel jacket to the outer surface of said first lower pressure vessel jacket, and means connected to said second upper pressure vessel jacket and said second lower pressure vessel jacket for moving said pressure vessel jackets toward and away from each other.

6. A pressure vessel enclosure comprising a primary pressure vessel, a top grid plug, a first pressure vessel containment assembly adapted to enclose said primary vessel and be spaced apart therefrom, a main body liner adapted to enclose said first pressure vessel containment assembly, a belt-line reinforcing sleeve adapted to encircle said main body liner proximate the mid-portion of said first pressure vessel containment assembly, a first upper pressure vessel jacket adapted to enclose the upper half of said first pressure vessel containment assembly and be spaced apart therefrom, said upper pressure vessel jacket having an upper rim and a lower rim, means for connecting in a sliding and sealable relationship said upper rim of said first upper pressure vessel jacket to the outer surface of said top grid plug, means for connecting in a slidable sealable relationship said lower rim of said first upper pressure vessel jacket to the outer surface of said belt-line reinforcing sleeve, a first lower pressure vessel jacket adapted to enclose the lower half of said first pressure vessel containment assembly and be spaced apart therefrom, said lower pressure vessel jacket having an upper rim, and means for connecting in a sealable relationship said upper rim of said first lower pressure vessel jacket to the outer surface of said belt-line reinforcing sleeve, a second upper pressure vessel jacket adapted to enclose said first upper pressure vessel jacket and be spaced apart therefrom, said second upper pressure vessel jacket having an upper rim and a lower rim, said upper rim adapted to slidably engage the upper rim of said first upper pressure vessel jacket, said lower rim adapted to slidably engage the outer surface of said lower rim of said first upper pressure vessel jacket, means for sealing said upper rim of said second upper pressure vessel jacket to the outer surface of said upper rim of first upper pressure vessel jacket, means for sealing said lower rim of said second upper pressure vessel jacket to the outer surface of said lower rim of said first upper pressure vessel jacket, a second lower pressure vessel jacket adapted to enclosure said first lower pressure vessel jacket and be spaced apart therefrom, said second lower pressure vessel jacket having an upper rim adapted to slidably engage the outer surface of said upper rim of said fist lower pressure vessel jacket, means for sealing said upper rim of said second lower pressure vessel jacket to the outer surface of said upper rim of said first lower pressure vessel jacket, and means connected to said second upper pressure vessel jacket and said second lower pressure vessel jacket for moving said pressure vessel jackets toward and away from each other.

7. A pressure vessel safety enclosure comprising a primary pressure vessel, a first pressure vessel containment assembly adapted to enclose said primary pressure vessel and be spaced apart therefrom, comprising a set of cast block members shaped and assembled to define a containment vessel having upper and lower portions, means defining a metal liner adapted to enclose said set of assembled block members, means for maintaining a compressive force against said metal liner comprising a pair of first upper and first lower pressure vessel jackets adapted to enclose and be spaced apart, respectively, from upper and lower portions of said first pressure vessel containment assembly, a fluid under compression disposed in said space between said upper and lower pressure vessel jackets and said pressure vessel containment assembly, said first upper and lower pressure vessel jackets comprising rims proximate their openings, said rims connected in a slidable and sealed relationship to said first pressure vessel containment assembly, and means connected to said pressure vessel jackets for moving said jackets toward and away from each other.

* * * * *